March 1, 1966           C. A. RUPLE           3,238,290
DEAD END ANCHOR FOR HIGH VOLTAGE CABLES
Filed March 13, 1963
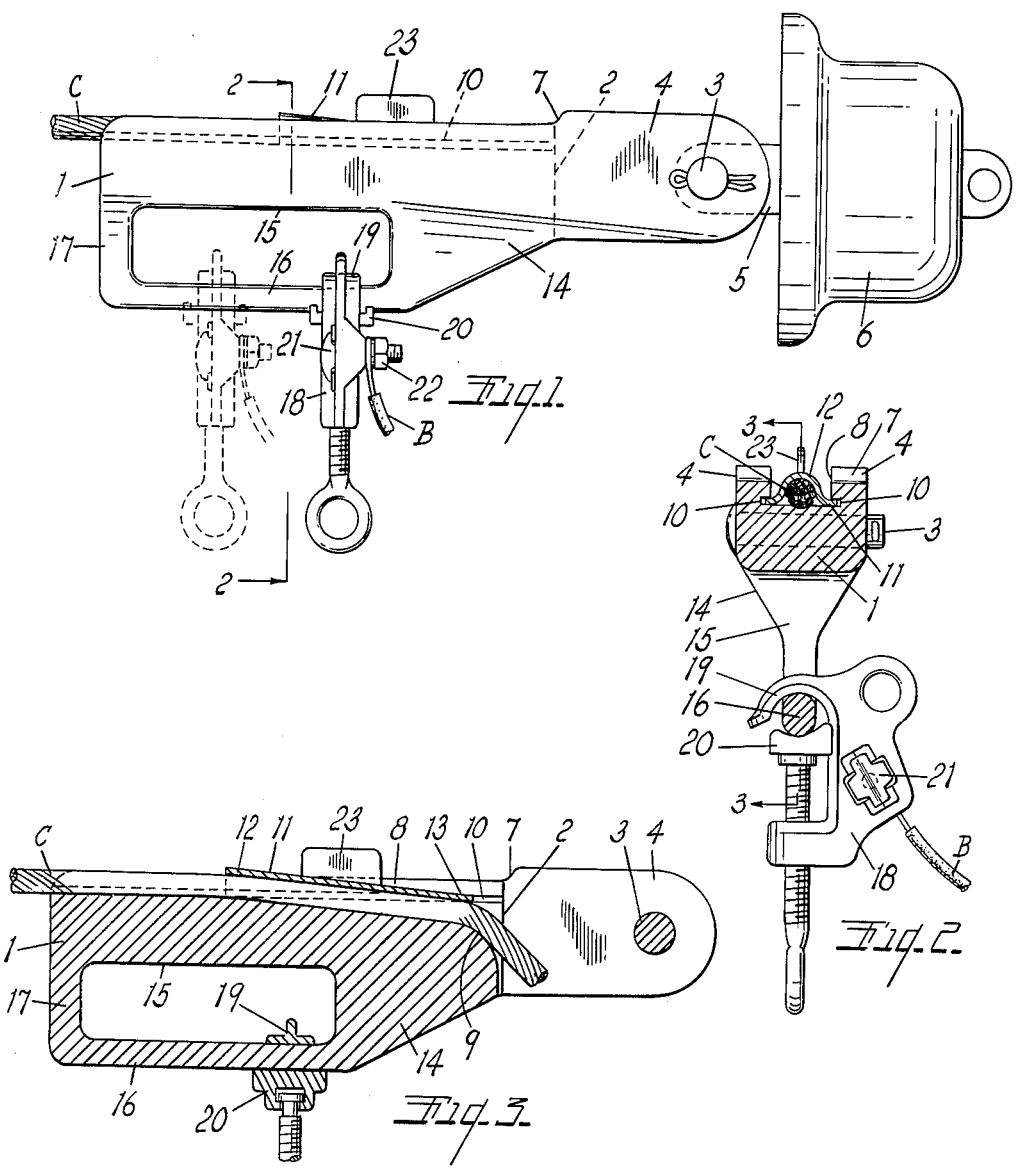
INVENTOR.
Charles A. Ruple
BY
ATTORNEY United States Patent Office 3,238,290
Patented Mar. 1, 1966

3,238,290
DEAD END ANCHOR FOR HIGH
VOLTAGE CABLES
Charles A. Ruple, R.F.D. 2, Dowagiac, Mich.
Filed Mar. 13, 1963, Ser. No. 264,860
1 Claim. (Cl. 174—79)

This invention relates to improvements in dead end anchor for high voltage cables. The principal objects of this invention are:

First, to provide a novel dead end anchor with means for attaching branch wires and cables directly to the anchor by means of standard branch wire clamps attachable with hot sticks without deenergizing the high voltage cable supported by the anchor.

Second, to provide a dead end anchor for high voltage cables that will securely anchor the cable against wear at the point of connection and permit the attachment of branch wire clamps to the anchor instead of to the cable.

Third, to provide a dead end anchor with a common opening adapted to receive both a cable tightening pulley connection and one or more branch wire clamps of standard design.

Other objects and advantages of the invention will be apparent from a consideration of the following description and claim. The drawings, of which there is one sheet, illustrate a highly practical form of the anchor.

FIG. 1 is a side elevational view of the anchor with a primary high voltage cable attached thereto and with a branch wire connected to the anchor by a branch clamp.

FIG. 2 is a transverse cross sectional view taken along the line 2—2 in FIG. 1.

FIG. 3 is a longitudinal cross sectional view taken along the plane of the line 3—3 in FIG. 2.

The cable clamp and anchor of the invention is used for anchoring the ends of high voltage electric cables to poles, towers or cross arms. The anchor includes a body 1 of generally rectangular cross section. One end of the body is bifurcated as at 2 with a pin 3 extending between the ears 4 of the bifurcation to connect the body in tension load transmitting and supporting relation to the connecting member 5 of an insulator 6, sometimes called a bell. The top side of the body is stepped down at 7 and longitudinally slotted at 8 to receive the end of the cable C to be anchored. The bottom of the slot curves downwardly as at 9 into the space between the ears 4 and a pair of straight grooves 10 in opposite sides of the slot receive the edges of a wedge plate 11. The plate is rounded at its forward end as at 12 and tapers to a flat rear end 13 to wedgingly grip or clamp the cable to the bottom of the slot and the curve 9. The body is metallic and conveniently cast of aluminum and the wedge plate 11 is a stamping of sheet steel.

Depending from the bottom of the body is a downwardly tapering flange or rib 14 disposed forwardly of the bifurcation 2. The flange is cut away in a rectangular opening 15 leaving a connector bar 16 of rounded cross section and a front pulling bar 17 that tapers vertically.

The pulling bar 17 is adapted to receive the hook on one end of a set of pulley blocks while a gripper on the other end of the pulley blocks is engaged with the cable to pull the cable into the slot and raise the cable to the desired tension and height. After the cable is at the correct tension, the wedge plate 11 is driven forwardly in the grooves 10 to clamp the cable in place.

The connector bar 16 is of a size approximating the size of high voltage electric cables and is therefore adapted to receive and engage standard branch wire clamps 18. The clamps have a hooked upper end 19 that hooks over the bar and a screw adjusted lower jaw 20 that mechanically and electrically connects the clamp to the bar and through it to the anchor block and cable C. The clamp has a separate clamping jaw 21 and nut 22 that electrically connect the branch wire or cable B to the branch clamp. The mechanical connection of the branch wire to the clamp 18 can be made while both are dead electrically and the clamp is designed to be engaged and disengaged relative to the bar 16 by means of an insulated pole called a "hot stick." The bar 16 and opening 15 are at least two inches long so that two or more branch clamps and wires can be attached as needed to the primary cable.

The anchor securely supports the primary cable against damage due to vibration and swinging of the cable in the wind and the branch cable clamps 18 have a solid electrical and mechanical connection to the bar 16 that makes the desired electrical connection without mechanical damage to the primary cable. A drive ear 23 secured to the top of the wedge plate 11 projects above the top of the body 1 and facilitates driving the wedge into or out of cable gripping position.

What is claimed as new is:

A dead end electric cable clamp and anchor comprising,
an elongated metal body having a bifurcated end adapted to be connected to a dead end strain type insulator,
a cable receiving slot formed longitudinally in the surface of said body and directed toward the insulator connectable end of the body with the bottom of the slot curved convexly with respect to the side of said body opposite said slotted surface between the bifurcations of said bifurcated end,
straight grooves formed in the sides of said slot, said grooves extending into said metal body and extending to one end of the slot,
a wedge member having its edges slidably received in said grooves, the opposed surfaces of the bottom of said slot and the bottom of said wedge converging towards each other as said wedge is moved in said slot away from said bifurcated end,
and a longitudinal rib formed on a side of said body away from said slotted side,
said rib defining an elongated opening leaving a bottom connector bar at least two inches long adapted to receive a branch wire clamp with a pull bar at the opposite end of the rib from the bifurcated end of the body.

References Cited by the Examiner
UNITED STATES PATENTS

| 2,068,368 | 1/1937 | Bouvier et al. |
| 2,640,867 | 6/1953 | Clements _____ 174—79 X |
| 2,885,653 | 5/1959 | Bethea et al. _____ 339—243 |
| 2,980,378 | 4/1961 | Bethea _____ 174—79 X |
| 3,026,368 | 3/1962 | Lindsey _____ 248—63 X |
| 3,062,936 | 11/1962 | Gilliland _____ 339—109 |
| 3,130,261 | 4/1964 | McCreery _____ 174—79 X |

FOREIGN PATENTS

| 1,084,200 | 1/1955 | France. |
| 601,245 | 12/1930 | Germany. |
| 297,159 | 9/1928 | Great Britain. |
| 295,826 | 4/1932 | Italy. |
| 308,103 | 6/1955 | Switzerland. |

JOHN F. BURNS, Primary Examiner.
JOHN P. WILDMAN, DARRELL L. CLAY, Examiners.